US010394953B2

(12) United States Patent
Satyavarta et al.

(10) Patent No.: US 10,394,953 B2
(45) Date of Patent: Aug. 27, 2019

(54) MEME DETECTION IN DIGITAL CHATTER ANALYSIS

(71) Applicant: Facebook, Inc., Menlo Park, CA (US)

(72) Inventors: Satyavarta Satyavarta, Palo Alto, CA (US); Guven Burc Arpat, Los Altos, CA (US); Mui Thu Tran, San Carlos, CA (US)

(73) Assignee: Facebook, Inc., Menlo Park, CA (US)

( * ) Notice: Subject to any disclaimer, the term of this patent is extended or adjusted under 35 U.S.C. 154(b) by 516 days.

(21) Appl. No.: 14/802,890

(22) Filed: Jul. 17, 2015

(65) Prior Publication Data

US 2017/0017638 A1 Jan. 19, 2017

(51) Int. Cl.
*G06F 17/27* (2006.01)
*H04L 12/58* (2006.01)

(52) U.S. Cl.
CPC .......... *G06F 17/278* (2013.01); *G06F 17/272* (2013.01); *G06F 17/274* (2013.01); *H04L 51/12* (2013.01); *H04L 51/32* (2013.01)

(58) Field of Classification Search
CPC .... G06F 17/278; G06F 17/272; G06F 17/274; G06F 17/2785; H04L 51/12; H04L 51/32; G06Q 50/01
USPC .......................................................... 706/12
See application file for complete search history.

(56) References Cited

U.S. PATENT DOCUMENTS 8,185,558 B1 5/2012 Narayanan, Sr. et al.
8,736,612 B1 5/2014 Goldman et al.
8,965,970 B2 2/2015 Chang et al.
2012/0047219 A1* 2/2012 Feng .................. G06F 17/3071 709/207
2012/0252729 A1 10/2012 Shirae et al.
2012/0296991 A1* 11/2012 Spivack ................ G06Q 10/10 709/206
2013/0290317 A1 10/2013 Spivack et al.
2013/0298038 A1* 11/2013 Spivack ............... H04L 65/403 715/753
2014/0040281 A1* 2/2014 Spivack ............. G06F 17/3053 707/748

(Continued)

OTHER PUBLICATIONS

Ferrara E. et al., "Clustering Memes in Social Media", 2013 IEEE/ACM International Conference on Advances in Social Networks Analysis and Mining, ASONAM'13, Aug. 25-29, 2013, Niagara, Ontario, CAN.*

(Continued)

*Primary Examiner* — Dave Misir
(74) *Attorney, Agent, or Firm* — Baker Botts L.L.P.

(57) ABSTRACT

Some embodiments include a method of detecting memes, as "key terms," in a chatter aggregation in a social networking system. The method can include aggregating user-generated content objects within the social networking system into the chatter aggregation according to a set of filters. A meme analysis engine can define a target group within the chatter aggregation to compare against a background group. The meme analysis engine can extract key terms from textual content of the target group. The meme analysis engine can determine a relevancy rank of a term in the key terms based on an accounting of the term in the textual content of the target group and a linguistic relevance score of the term according to a linguistic model.

20 Claims, 11 Drawing Sheets

(56) References Cited

U.S. PATENT DOCUMENTS

| | | | | |
|---|---|---|---|---|
| 2014/0052540 | A1* | 2/2014 | Rajaram | G06Q 30/0255 705/14.66 |
| 2015/0169587 | A1* | 6/2015 | Silverman | G06F 17/3053 707/751 |
| 2015/0256636 | A1* | 9/2015 | Spivack | G06Q 10/10 715/736 |
| 2016/0005196 | A1* | 1/2016 | Awadallah | G06T 11/206 345/440 |
| 2016/0055164 | A1* | 2/2016 | Cantarero | G06F 17/30064 707/740 |
| 2016/0080476 | A1* | 3/2016 | Sandell | H04W 4/08 709/204 |
| 2016/0292157 | A1* | 10/2016 | Zhang | G06F 17/30867 |
| 2016/0358086 | A1 | 12/2016 | Sundram et al. | |
| 2016/0378757 | A1 | 12/2016 | Bahl | |

OTHER PUBLICATIONS

Goorha S. et al., "Discovery of Significant Emerging Trends", KDD'10, Jul. 25-28, 2010, Washington, DC, USA.*

U.S. Appl. No. 14/732,534 by Sundram, J., et al. filed Jun. 5, 2015.

U.S. Appl. No. 14/747,917, of Bahl, A., filed Jun. 23, 2015.

Niu, F. et al., "Hogwild!: A Lock-Free Approach to Parallelizing Stochastic Gradient Descent," In Advances in Neural Information Processing Systems, 2011, pp. 1-22.

Cheong, M. et al. "A microblogging-based approach to terrorism informatics: Exploration and chronicling civilian sentiment and response to terrorism events via Twitter" Information System Fronteirs, vol. 13 (2011) pp. 45-59.

Huang, J. et al. "A cross-sectional examination of marketing of electronic cigarettes on Twitter" Tob Control, vol. 23, (2014), pp. iii26-iii30.

Non-Final Office Action dated Oct. 25, 2017 U.S. Appl. No. 14/747,917 by Bahl, A., et al., filed Jun. 23, 2015.

Non-Final Office Action dated Oct. 6, 2017 for U.S. Appl. No. 14/732,534 by Sundram, J., et al., filed Jun. 5, 2015.

Vavliakis, K. et al. "Event identification in web social media through named entity recognition and topic modeling" Data and Knowledge Engineering, vol. 88 (2013), pp. 1-24.

Young, S. et al. "Methods of using real-time social media technologies for detection and remote monitoring of HIV outcomes" Preventative Medicine, vol. 63, (2014) pp. 112-115.

* cited by examiner

400

| Tracker ID (402) | Comparison ID (406) | Target Group ID (410) | Background Group ID (414) | Timestamp (420) |
|---|---|---|---|---|
| 623 | Region-US-enVsAll-US-en | Region-US-en | All-US-en | 2015-03-26 |
| 193 | Age-US-enVsAll-US-en | Age-US-en | All-US-en | 2015-03-26 |
| 193 | Gender-US-enVsAll-US-en | Gender-US-en | All-US-en | 2015-03-26 |
| 193 | Region-US-enVsAll-US-en | Region-US-en | All-US-en | 2015-03-26 |
| 438 | Age-US-enVsAll-US-en | Age-US-en | All-US-en | 2015-03-26 |
| 438 | Gender-US-enVsAll-US-en | Gender-US-en | All-US-en | 2015-03-26 |
| 438 | Region-US-enVsAll-US-en | Region-US-en | All-US-en | 2015-03-26 |
| 623 | Age-US-enVsAll-US-en | Age-US-en | All-US-en | 2015-03-26 |

| tracker_id (502) | comment (506) | group_id (510) | language_spec (514) | sentiment_spec (518) | relation_spec (522) | age_spec (524) |
|---|---|---|---|---|---|---|
| 623 | chevy v2 | Age-US-en | en | positive | any | each |
| 623 | chevy v2 | All-US-en | en | positive | any | any |
| 623 | chevy v2 | Gender-US-en | en | positive | any | any |
| 623 | chevy v2 | Education-US-en | en | positive | any | any |
| 623 | chevy v2 | Relation-US-en | en | positive | each | any |
| 623 | chevy v2 | Age-Gender-US-en | en | positive | any | each |
| 623 | chevy v2 | Age-Relation-US-en | en | positive | each | each |
| 623 | chevy v2 | Education-Gender-US-en | en | positive | any | any |
| 623 | chevy v2 | Sentiment-US-en | en | negative | any | any |
| 623 | chevy v2 more | Region-US-en | en | positive | any | any |

| 530 gender_spec | 532 region_spec | 536 country_spec | 540 education_spec | 542 date_spec | 544 element_spec | 546 superregion_spec | 548 cluster_spec |
|---|---|---|---|---|---|---|---|
| any | any | US | any | any | each | any | any |
| any | any | US | any | any | each | any | any |
| each | any | US | any | any | each | any | any |
| any | any | US | each | any | each | any | any |
| any | any | US | any | any | each | any | any |
| each | any | US | any | any | each | any | any |
| any | any | US | any | any | each | any | any |
| each | any | US | each | any | each | any | any |
| any | any | US | any | any | each | any | any |
| any | each | US | any | any | each | any | any |

*FIG. 5B*

MEME DETECTION IN DIGITAL CHATTER ANALYSIS

BACKGROUND

Machine intelligence may be useful to gain insights to a large quantity of data that is undecipherable to human comprehension. Machine intelligence, also known as artificial intelligence, can encompass machine learning analysis, natural language parsing and processing, computational perception, or any combination thereof. These technical means can facilitate studies and researches yielding specialized insights that are normally not attainable by human mental exercises.

Machine intelligence can be used to analyze digital conversations, publications, and/or other user-generated content inputted by human beings. The digital conversations, publications, and other user-generated content can be collectively referred to as digital "chatter." For example, the machine intelligence can identify characteristics of the digital conversations that are pertinent in decision-making of application services in a social networking system. Analysis of digital chatter is sometimes difficult because of variations in human languages and the diversity of potential conversationalists. Thus, there remains challenges in developing a machine intelligence capable of providing insights from a diverse collection of conversations.

BRIEF DESCRIPTION OF THE DRAWINGS

FIG. 4 is an example illustration of a comparison definition table, in accordance with various embodiments.

FIG. 5A is an example illustration of a first portion of a group definition table, in accordance with various embodiments.

FIG. 5B is an example illustration of a second portion of the group definition table of FIG. 5A, in accordance with various embodiments.

Figure 1:
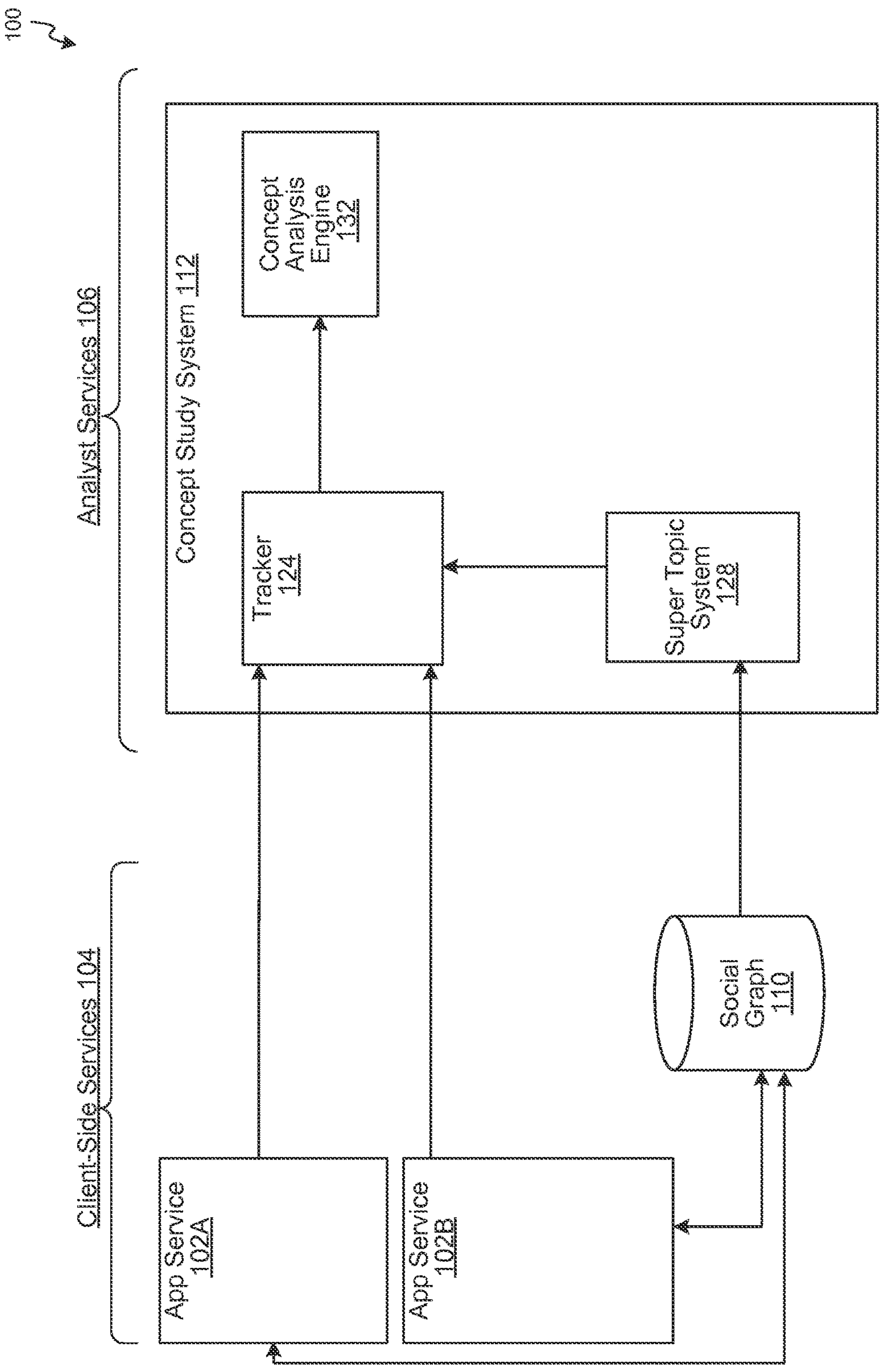
FIG. 1 is a block diagram illustrating an online discussion platform system implementing a concept study system, in accordance with various embodiments.

The figures show various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Several embodiments are directed to a concept study system implementing a meme analysis engine. The concept study system can be used to provide insights and generate studies of user "chatter" (e.g., user posts, status updates and/or comments) in an application service system or a social networking system. The concept study system can implement various concept studies (e.g., content analysis studies) that analyze content related to user activities (e.g., content engagement activities and/or content generation activities). In several embodiments, the meme analysis engine can determine differences in how people talk about a particular topic or concept, and identify the memes used by different groups of people involved in conversations of the particular topic or concept.

The concept study system can utilize a super topic taxonomy comprised of a set of concept identifiers to filter content. The concept study system can identify content around a central theme in accordance with the super topic taxonomy. The identified content can be the basis of a concept study. Based on the set of concept identifiers, the concept study system can generate one or more classifier machines as content filters that determine whether or not a content object associated with a user activity is relevant to the concept study according to the super topic taxonomy. A classifier machine can be a computational model that processes at least a content object and produces a categorization of the content object. The classifier machine can be implemented as a computational engine, program, or module.

In one example, a classifier machine can take a serialized data row representing a content object corresponding to a user activity as its input. The classifier machine can determine which, if any, of the monitored super topic taxonomies corresponding to one or more concept studies that the content object belongs to. This determination can produce an assignment of the content object, the user activity, and/or an acting user of the user activity to a study-specific data storage.

The concept study system enables labeling of a stream of user-generated content according to topical interests of the concept study system in real time. This then enables the concept study system to aggregate and compile user-generated content (e.g., from user content publication activities) occurring in an online platform (e.g., a social networking system). The meme analysis engine can then analyze the user-generated content (e.g., user conversations) to identify one or more memes (e.g., key terms) used by groups of people participating in those discussions/publications and differences in how those groups use the memes. A key term can be a single word or two or more consecutive words.

The meme analysis engine can create a target group within the collected user-generated content as a target for analysis. The target group can be segmented by demographic of conversation participants or linguistic patterns in the collected user-generated content. The target group is a subset of the collected user-generated content. The meme analysis engine can also define a background group, which can be, for example, a superset of the target group or a complementary category to the target group. The meme analysis engine can identify key terms (e.g., two or more consecutive words and/or single words) occurring multiple times in the target group and the background group and rank them by a relevancy metric.

For example, a relevancy ranking engine can rank a meme/key term based on absolute relevancy and/or linguistic relevancy. Absolute relevancy ranking of a meme can be based on number of posts within a group (e.g., the target group or the background group) that includes the meme therein and/or rate of change in frequency of posts associated with the meme within the group. Linguistic relevancy ranking of a meme can be based on natural language analysis of content including the meme, including for example, whether the meme contains a stop word, whether the meme is a duplicative phrase for another key term, and/or frequency of the meme being in a complete phrase.

Referring now to the figures, FIG. 1 is a block diagram illustrating an online discussion platform system 100 implementing a concept study system 112, in accordance with various embodiments. The online discussion platform system 100 provides one or more application services (e.g., an application service 102A and an application service 102B, collectively as the "application services 102") to client devices over one or more networks (e.g., a local area network and/or a wide area network) to facilitate discussion or conversation. The application services 102 can enable users of the client devices to push user-generated content (e.g., messages, posts, status updates, or any combination thereof) to the online discussion platform system 100 for sharing with one or more other users.

The online discussion platform system 100 can provide the application services 102 via an application programming interface (API), a Web server, a mobile service server (e.g., a server that communicates with client applications running on mobile devices), or any combination thereof. In some embodiments, the online discussion platform system 100 can be a social networking system (e.g., the social networking system 902 of FIG. 9). The application services 102 can process client requests in real-time. The client requests can be considered "live traffic." For example, the application services 102 can include a forum, a photo sharing tool, a location-based tool, an advertisement platform, a media service, an interactive content service, a messaging service, a social networking service, or any combination thereof.

The online discussion platform system 100 can include one or more client-side services 104 that are exposed to the client devices, directly or indirectly. The online discussion platform system 100 can also include one or more analyst services 106. In some embodiments, the analyst services 106 are not exposed to the client devices. In some embodiments, the analyst services 106 can be exposed to a limited subset of the client devices. In some cases, the analyst services 106 can be used by operators of the online discussion platform system 100 to gain insights based on activities of the client-side services 104 (e.g., in real-time or asynchronously relative to the activities). In some embodiments, outputs (e.g., insights to the conversations of users) of the analyst services 106 can be used to monitor, maintain, or improve the application services 102 and/or trigger automated responses from the client-side services 104. In some embodiments, the analyst services 106 are implemented on a separate system external to the online discussion platform system 100.

The online discussion platform system 100 can include or be coupled to the concept study system 112. The concept study system 112 can be one of the analyst services 106. The concept study system 112 can monitor and analyze user activities with the application services 102 to generate insights. For example, a content analysis engine 132 can generate insights in real-time, substantially real-time, or asynchronously relative to the user activities (e.g., publication activities of user-generated content). For example, real-time user activities (e.g., user-initiated services requests and responses) can be tracked and aggregated by a tracker engine 124 and then provided to the content analysis engine 132 for processing. In some embodiments, real-time user activities can be tracked by the action logger 914 of FIG. 9. Past user activities can be tracked in a social graph 110. For example, the social graph 110 can be stored in the edge store 918 of FIG. 9.

The client-side services 104 can forward user activities, in real-time or in batches, to the tracker engine 124. The tracker engine 124 can determine whether or not a particular user activity pertains to a "concept study." A concept study is a content analysis study pertaining to a conceptual topic represented by a super topic taxonomy. The concept study provides a way to utilize machine intelligence to compute insights pertaining to user activities related to a central concept (e.g., theme) by analyzing user-generated content in the online discussion platform system 100. The concept study system 112 can utilize one or more classifier machines to determine whether a user activity relates to a central concept. In some embodiments, each classifier machine corresponds to a single concept study. A classifier machine can be generated based on a super topic taxonomy.

In some embodiments, the tracker engine can aggregate user-generated content relating to the central concept into a concept-specific data storage. The content analysis engine 132 can then analyze the aggregated content as a whole. For example, the content analysis engine 132 can perform meme detection as described in several embodiments of this disclosure. In some embodiments, the content analysis engine 132 can sub-divide the aggregated content into groups. For example, the content analysis engine 132 can divide the aggregated content into at least a target group and a background group. In some embodiments, the background group is everything in the aggregated content except for content in the target group. In some embodiments, the background group is all of the aggregated content. In some embodiments, the background group is a subset of the aggregated content that is not part of the pivot group.

Meme detection can include detecting relevant key terms (e.g., multiword terms and/or single words) present in the content of the target group and relevant key terms present in the content of the background group. In some embodiments, meme detection can include computing the most representative sentence in the target group and/or the most representative sentence in the background group.

A classifier machine used by the tracker engine 124 can be based on a super topic taxonomy defined in the super topic system 128. In some embodiments, a single concept study can have multiple super topic taxonomies. In some embodiments, a single concept study can have only a single super topic taxonomy. The concept study system 112 can utilize a super topic taxonomy to identify a subset of activities within the online discussion platform system 100 (e.g., a social networking system) for analysis.

A user interface of the super topic system 128 can construct a super topic taxonomy by identifying one or more concept identifiers to associate with the super topic taxonomy. An analyst user can seed the super topic taxonomy with one or more explicit concept identifiers. Concept identifiers are ways of identifying content (e.g., user-generated digital chatter) as being related to a central concept.

Concept identifiers used to build a super topic taxonomy can include, for example, topic tags, hashtags, and/or terms. A topic tag, for example, can be represented as a social network page. A hashtag is a word that may be found within user-generated content denoting an authoring user's own intention for the content to be part of a topic or theme. A hashtag can have a known prefix or suffix (e.g., typically a prefix of the pound symbol "#"). A hashtag can be represented as a social network object. A term can be a text string comprised of two or more consecutive words.

User-generated content can be associated with a topic tag based on a topic inference engine or based on user indication (e.g., an explicit mention in a post or a status update. A topic tag can be a social network object that references a social network page. The topic tag can be associated with a portion of content in one or more ways. In one example, a social networking system can implement a topic inference module that infers topics based on content items in user-generated content. For example, U.S. patent application Ser. No. 13/589,693, entitled "Providing Content Using Inferred Topics Extracted from Communications in a Social Networking System" discloses a way to infer interests based on extracted topics from content items on a social networking system. In another example, an authoring user of a piece of content can associate the topic tag with the piece of content that it creates. For example, this can occur by an explicit reference to a social networking page in a user post (e.g., a social network "mention") or an explicit reference in a status update or minutia. In some cases, a user visiting the social network object can make the topic tag.

A hash tag is an example of a concept identifier that associates with content based on the authoring user of the content. A hashtag is a word or phrase preceded by a hash or pound sign ("#") to identify messages relating to a specific topic. The authoring user can insert the hashtag in a piece of content he or she generates. For example, a hashtag can appear in any user-generated content of social media platforms, such as the social networking system 902 of FIG. 9.

A term object is a set of words (e.g., bigrams, trigrams, etc.) that may be tracked by the social networking system. In some embodiments, while the topic tag is associated with a social network page in a social graph of the social networking system, a term object is not part of the social graph. In these embodiments, term objects are tracked, via the tracker engine 124, in content objects of the social networking system once they are explicitly defined.

In some cases, a concept identifier may be associated with other concept identifiers according to a grouping of known similar concepts in the online discussion platform system 100. For example, a social networking system can implement a system to cluster social network pages having the same or substantially similar title or description and select one of the social network pages and its associated topic tag as the canonical topic tag associated with the title or description. A concept identifier that references a canonical topic tag can reference multiple social network pages within the cluster corresponding to the canonical topic tag. For example, U.S. patent application Ser. No. 13/295,000, entitled "Determining a Community Page for a Concept in a Social Networking System" discloses a way for equivalent concepts expressed across multiple domains to be matched and associated with a metapage generated by a social networking system.

In several embodiments, the user activities being tracked by the tracker engine 124 can come from the online discussion platform system 100 and/or a computer system external to the online discussion platform system 100. In several embodiments, the past user activities used by the super topic system 128 to suggest concept recommendations can come from the online discussion platform system 100 and/or a computer system external to the online discussion platform system 100.

Figure 9:
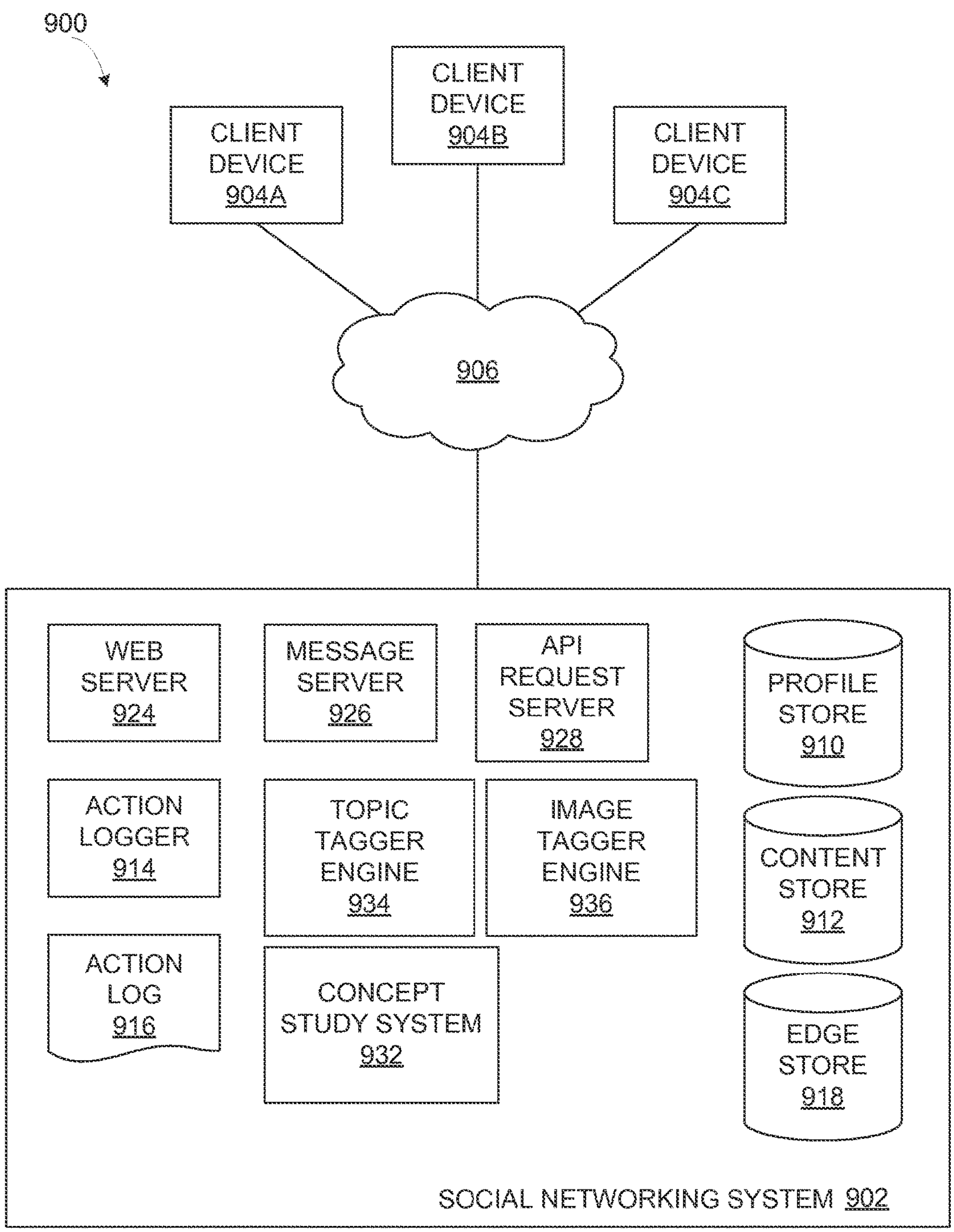
FIG. 9 is a high-level block diagram of a system environment suitable for a social networking system, in accordance with various embodiments.

In some embodiments, one or more objects (e.g., social network objects) of a social networking system (e.g., the online discussion platform system 100 or the social networking system 902 of FIG. 9) may be associated with a privacy setting. The privacy settings (or "access settings") for an object may be stored in any suitable manner, for example, in association with the object, in an index on an authorization server, in another suitable manner, or any combination thereof. A privacy setting of an object may specify how the object (or particular information associated with an object) can be accessed (e.g., viewed or shared) using the social networking system. Where the privacy settings for an object allow a particular user to access that object, the object may be described as being "visible" with respect to that user.

For example, a user of the social networking system may specify privacy settings for a user-profile page that identify a set of users that may access the work experience information on the user-profile page, thus excluding other users from accessing the information. In some embodiments, the privacy settings may specify a "blocked list" of users that should not be allowed to access certain information associated with the object. In other words, the blocked list may specify one or more users or entities (e.g., groups, companies, application services, etc.) for which an object is not visible. For example, a user may specify a set of users that may not access photos albums associated with the user, thus excluding those users from accessing the photo albums (while also possibly allowing certain users not within the set of users to access the photo albums).

In some embodiments, privacy settings may be associated with particular social-graph elements. Privacy settings of a social-graph element, such as a node or an edge, may specify how the social-graph element, information associated with the social-graph element, or content objects associated with the social-graph element can be accessed using the social networking system. For example, a social network object corresponding to a particular photo may have a privacy setting specifying that the photo may only be accessed by users tagged in the photo and their friends. In some embodiments, privacy settings may allow users to opt in or opt out of having their actions logged by social networking system or shared with other systems (e.g., internal or external to the social networking system). In some embodiments, the privacy settings associated with an object may specify any suitable granularity of permitted access or denial of access. For example, access or denial of access may be specified for particular users (e.g., only me, my roommates, and my boss), entities, applications services, groups of entities, users or entities within a particular degrees-of-separation (e.g., friends, or friends-of-friends), user groups (e.g., the gaming club, my family), user networks (e.g., employees of particular employers, students or alumni of particular university), all users ("public"), no users ("private"), users of external systems, particular applications (e.g., third-party applications, external websites, etc.), other suitable users or entities, or any combination thereof. Although this disclosure describes using particular privacy settings in a particular manner, this disclosure contemplates using any suitable privacy settings in any suitable manner.

In some embodiments, one or more servers may be authorization/privacy servers for enforcing privacy settings. In response to a request from a user or an entity for a particular object stored in a data store of the social networking system, the social networking system may send a request to the data store for the object. The request may identify the user or entity associated with the request and may only fulfill the request if the authorization server determines that the user is authorized to access the object based on the privacy settings associated with the object. If the requesting user is not authorized to access the object, the authorization server may prevent the requested object from being retrieved, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Social Networking System Overview

Several embodiments of the online discussion platform system 100 utilize or are part of a social networking system. Social networking systems commonly provide mechanisms enabling users to interact with objects and other users both within and external to the context of the social networking system. A social networking system user may be an individual or any other entity, e.g., a business or other non-person entity. The social networking system may utilize a web-based interface or a mobile interface comprising a series of inter-connected pages displaying and enabling users to interact with social networking system objects and information. For example, a social networking system may display a page for each social networking system user comprising objects and information entered by or related to the social networking system user (e.g., the user's "profile").

Social networking systems may also have pages containing pictures or videos, dedicated to concepts, dedicated to users with similar interests ("groups"), or containing communications or social networking system activity to, from or by other users. Social networking system pages may contain links to other social networking system pages, and may include additional capabilities, e.g., search, real-time communication, content-item uploading, purchasing, advertising, and any other web-based inference engine or ability. It should be noted that a social networking system interface may be accessible from a web browser or a non-web browser application, e.g., a dedicated social networking system application executing on a mobile computing device or other computing device. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, a social graph can include a set of nodes (representing social networking system objects, also known as social objects) interconnected by edges (representing interactions, activity, or relatedness). A social networking system object may be a social networking system user, nonperson entity, content item, group, social networking system page, location, application, subject, concept or other social networking system object, e.g., a movie, a band, or a book. Content items can include anything that a social networking system user or other object may create, upload, edit, or interact with, e.g., messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or idea.

A social networking system may enable a user to enter and display information related to the user's interests, education and work experience, contact information, demographic information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may enable a user to upload or create pictures, videos, documents, songs, or other content items, and may enable a user to create and schedule events. Content items and events may be represented by nodes in the social graph.

A social networking system may provide various means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

A social networking system may provide a variety of communication channels to users. For example, a social networking system may enable a user to email, instant message, or text/SMS message, one or more other users; may enable a user to post a message to the user's wall or profile or another user's wall or profile; may enable a user to post a message to a group or a fan page; or may enable a user to comment on an image, wall post or other content item created or uploaded by the user or another user. In least one embodiment, a user posts a status message to the user's profile indicating a current event, state of mind, thought, feeling, activity, or any other present-time relevant communication. A social networking system may enable users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection is a social network edge. Being friends in a social networking system may allow users access to more information about each other than would otherwise be available to unconnected users. For example, being friends may allow a user to view another user's profile, to see another user's friends, or to view pictures of another user. Likewise, becoming friends within a social networking system may allow a user greater access to communicate with another user, e.g., by email (internal and external to the social networking system), instant message, text message, phone, or any other communicative interface. Being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected (such as a soft or implicit connection) for the purposes of determining social context for use in determining the topic of communications. In at least one embodiment, users who belong to a common network are considered connected. For example, users who attend a common school, work for a common company, or belong to a common social networking system group may be considered connected. In at least one embodiment, users with common biographical characteristics are considered connected. For example, the geographic region users were born in or live in, the age of users, the gender of users and the relationship status of users may be used to determine whether users are connected. In at least one embodiment, users with common interests are considered connected. For example, users' movie preferences, music preferences, political views, religious views, or any other interest may be used to determine whether users are connected. In at least one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 2:
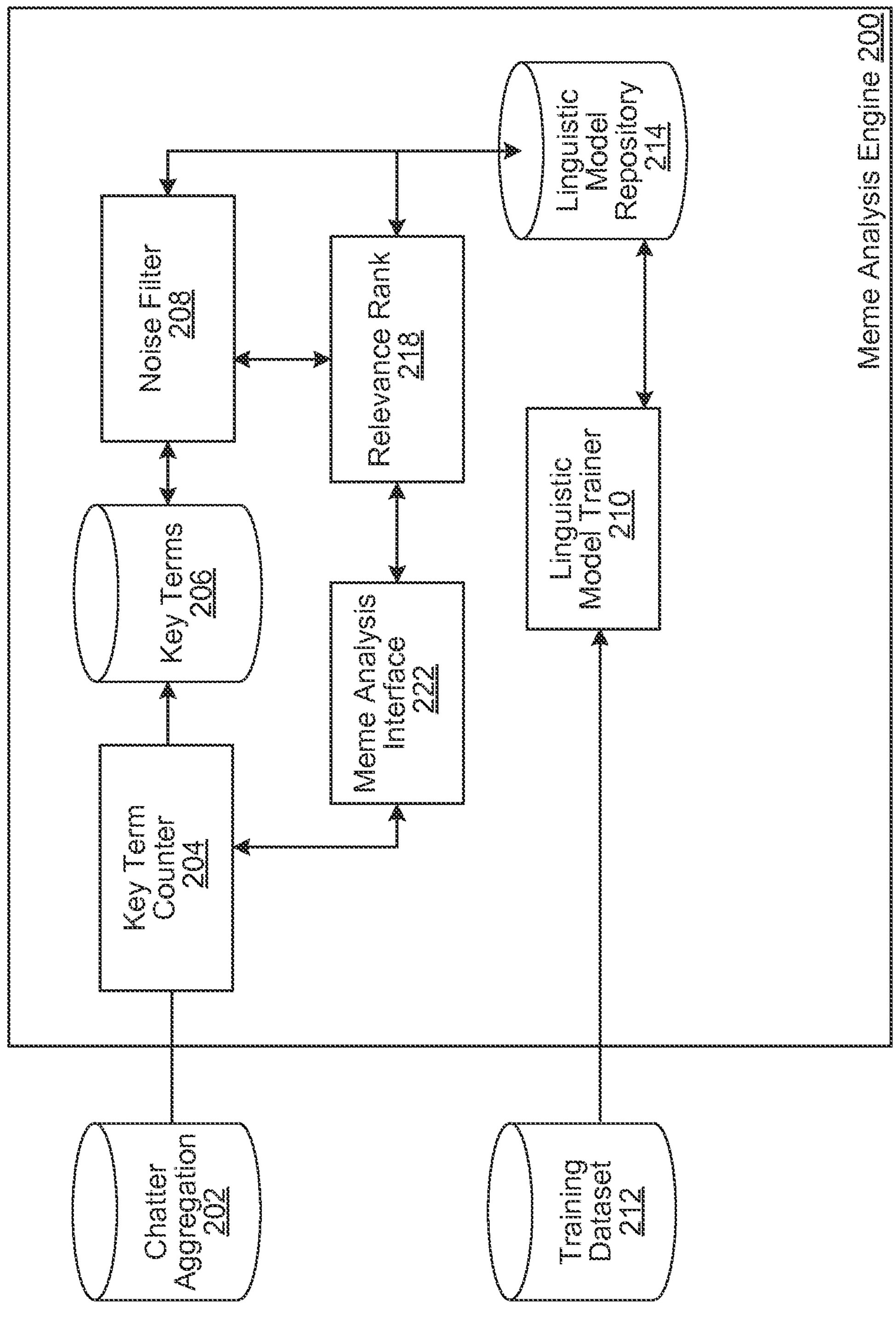
FIG. 2 is a block diagram illustrating a meme analysis engine, in accordance with various embodiments.

FIG. 2 is a block diagram illustrating a meme analysis engine 200, in accordance with various embodiments. The meme analysis engine 200 can be the content analysis engine 132 of FIG. 1. The meme analysis engine 200 can analyze a chatter aggregation in a chatter aggregation repository 202 provided by a tracker engine (e.g., the tracker engine 124 of FIG. 1). The meme analysis engine 200 includes a key term counter engine 204, a key terms repository 206, a noise filter engine 208, a linguistic model trainer engine 210, a training dataset repository 212, a linguistic model repository 214, a relevance rank engine 218, a meme analysis interface 222, or any combination thereof.

The chatter aggregation repository 202 stores an aggregation of user-generated content. The chatter aggregation can include various types of content objects (e.g., user posts, user comments, user status updates, other types of user messages, or any combination thereof). The chatter aggregation can include different authoring users. In several embodiments, the chatter aggregation is selected to correspond to a central concept (e.g., theme) as defined by a super topic taxonomy.

The chatter aggregation includes textual content. In some embodiments, the chatter aggregation includes metadata associated with the textual content. In some embodiments, the textual content is represented as content objects (e.g., user posts, user comments, user status updates, other user messages, or any combination thereof). In some embodiments, the chatter aggregation includes user profiles or references to user profiles associated with the authoring users of the content objects.

The key term counter engine 204 can detect key terms in the chatter aggregation and keep track of the number of occurrence for each of the key terms in the chatter aggregation. For example, the key term counter engine 204 can roll through the textual content of the chatter aggregation to detect the terms in a single pass. In some embodiments, the key terms are two or more consecutive words. In some embodiments, the key terms include one or more single word terms. In some embodiments, the key terms include only bigrams or only a specific N-gram, where N is a constant integer number. The key term counter engine 204 can store the detected key terms in the key terms repository 206. The key term counter engine 204 can also store the occurrence count of each key term in the key terms repository 206.

In several embodiments, the meme analysis engine 200 includes a noise filter engine 208. The noise filter engine 208 can remove key terms in the key terms repository 206 that are potentially irrelevant and/or do not provide insightful information. For example, the noise filter engine 208 can remove duplicate terms, remove terms corresponding to concept identifiers in the super topic taxonomy used to select the chatter aggregation, remove content with commercial intent, remove forms of spam, remove content with positive or negative sentiment, or any combination thereof.

In several embodiments, the meme analysis engine 200 can utilize the relevance rank engine 218 to sort the key terms in the key terms repository 206. In some embodiments, the relevance rank engine 218 can utilize absolute accounting of the occurrence counts of the key terms to rank the key terms. In some embodiments, the relevance rank engine 218 can utilize linguistic relevance scores of the key terms generated from one or more linguistic models to rank the key terms. In some embodiments, the relevance rank engine 218 can utilize both the linguistic relevance scores and the occurrence counts.

The linguistic model trainer engine 210 can create the linguistic models from the training dataset repository 212. The linguistic model trainer engine 210 can store the linguistic models in the linguistic model repository 214. For example, the linguistic model trainer engine 210 can implement one or more forms of machine learning (e.g., supervised or unsupervised machine learning) to build the linguistic model. The machine learning processes can include, for example, support vector machines, hidden Markov models, Gaussian mixture models, learning-to-rank models (e.g., gradient boosted trees with normalized discounted cumulative gain as loss function), binary classifiers (e.g., kernel support vector machines or gradient boosted trees), other natural language processing (NLP) models, or any combination thereof. For example, the training dataset repository 212 can include one or more sample terms and known labels associated with the sample terms. In some embodiments, a user interface can be used to present the sample terms to an operating user such that the operating user can identify the labels associated with the sample terms. A label can be represented as a binary, integer, or percentage value.

The labels can be associated with noise reduction. In one example, a label can include a value that indicates how likely a sample term is spam. In another example, a label can include a value that indicates how likely a sample term corresponds to commercial intent. The labels can be associated with linguistic categorization. In one example, a label can include a value that indicates how likely a sample term corresponds to a positive sentiment or a negative sentiment.

In some embodiments, a linguistic model can take a key term and/or its features as the linguistic model's input and generate a categorization as its output. In some embodiments, a linguistic model can take pairs of key terms and/or their features as the linguistic model's input and generate a score that represents how different or similar the key terms are from each other. This can be useful in noise reduction to reduce redundant key terms. For example, when training the linguistic model, the labels used can be associated with linguistic differentiation. In one example, a label can include a value that indicates how the terms are similar or different to each other. The noise filter engine 208 would want to differentiate between redundant terms (e.g., "small condominium" and "small condo") and non-redundant, yet similar, terms (e.g., "George Bush" and "George W. Bush").

In several embodiments, the relevance rank engine 218 accesses one or more of the linguistic models in the linguistic model repository 214 to rank the key terms in the key terms repository 206. In some embodiments, the relevance rank engine 218 ranks only the key terms that are not removed by the noise filter engine 208. In some embodiments, the noise filter engine 208 also accesses one or more of the linguistic models to identify irrelevant/redundant terms.

The meme analysis engine 200 can base its analysis on the ranking of the key terms computed by the relevance rank engine 218. In several embodiments, the meme analysis interface 222 enables an operating user (e.g., an analyst user) to specify a target group within the chatter aggregation. The target group can be specified as an audience segment or a chatter segment. An audience segment can be defined by a demographic profile attribute of authoring users of the content objects in the chatter aggregation. For example, the target group can correspond to content objects created by male authors. For another example, the target group can correspond to content objects created by authoring users with an estimated annual income of $50,000 or less. A chatter segment can correspond to attributes of the content objects. For example, the target group can correspond to user-generated content in status updates or other specific content type. For another example, the target group can correspond to user-generated content from a specific geographical region. For yet another example, the target group can correspond to user-generated content published or created in a specific time window (e.g., within the last 2 days). A chatter segment can also correspond to a derived attribute of the user-generated content (e.g., positive/negative sentiment by using a sentiment detection linguistic model).

In some embodiments, the meme analysis interface 222 also enables the operating user to define a background group. In some embodiments, the meme analysis interface 222 can derive the background group based on the target group. For example, the meme analysis interface 222 can identify a complementary group that is everything in the chatter aggregation minus the target group. For another example, the meme analysis interface 222 can identify the background group as the entire chatter aggregation. For yet another example, the meme analysis interface 222 can identify the background group as one of several complementary groups that are natural to the attribute dimension used to define the target group. That is, if a particular nationality of authoring users is used to define the target group, the other complementary groups can correspond to other nationalities.

The meme analysis interface 222 can identify and display top ranking key terms within the target group according to the rankings computed by the relevance rank engine 218. The meme analysis interface 222 can identify and display top ranking key terms within the background group according to the rankings computed by the relevance rank engine 218. The rankings can be computed specifically for the target group or the background group. For example, the rankings can be based on absolute accounting of key term occurrences within user-generated content in the target group.

In some embodiments, the meme analysis interface 222 can segment user-generated content in the target group from the chatter aggregation and send a command to the key term counter engine 204 to specifically identify and count occurrences of key terms in the user-generated content in the target group. In some embodiments, the key term counter engine 204 can identify and count occurrences of key terms in the chatter aggregation while maintaining metadata of authoring users and/or content objects responsible for each occurrence. In these embodiments, the key term counter engine 204 can identify the corresponding occurrence count within the target group without having to redo the occurrence counting.

Various type of visualization can be used to present and/or display the comparison between the top ranking terms of the target group and the top ranking terms of the background group. For example, the meme analysis interface 222 can display the meme insight visualization 312 of FIG. 3. In some embodiments, the meme analysis interface 222 can display a comparison table of the top ranking terms and their corresponding relevance scores and/or absolute accounting of occurrence.

The meme analysis engine 200 can examine differences in linguistic patterns in the comparison groups defined through the meme analysis interface 222. The pivots (e.g., attributes responsible for selecting a content object for a target group versus a background group) defining these comparison groups can be demographic (e.g., age, gender, region, country, relationship status, education, or any combination thereof). The pivots can an explicit attribute (e.g., existence of a term or a timestamp) or a derived attribute (e.g., sentiment or presence of commercial intent language) of content objects. All content objects falling into a group can be concatenated into a single document. For example, all bigrams or N-grams in this document can be candidate memes of which top relevant memes are surfaced. The meme analysis interface 22 can present or display sample posts in which the bigrams or N-grams appear.

In some embodiments, an evaluative metric for meme relevance has at least two components. One component can be an absolute relevance metric that captures purely numerical aspects of a key term. The numerical aspects, for example, can be increase in frequency, confidence measure of whether the increase is by chance (e.g., by statistical hypothesis testing), occurrence count, occurrence rate, or any combination thereof. Another component can be a linguistic relevance metric that captures the notion of how interesting the meme is to analysts or other users. The evaluation metric can be modeled as products or combinations these components (e.g., weighted or non-weighted products or combinations). In some embodiments, each component metric is modeled as a probability of an independent characteristic. Each component metric can also be comprised of component bases (e.g., sub-component metrics).

Some embodiments include a component basis for an absolute relevance metric based on occurrence rate differences of a key term. For example, a component basis can be a function of the difference between a target group occurrence rate (r1) and a background group occurrence rate (r2), represented as func(r1-r2). This component basis can measure the increase in occurrence rate of a key term in the target group (r1) versus in the background group (r2). A function, represented as "func(Δr)" (e.g., sigmoid function) can be applied to the difference in occurrence rate to ignore low rate increases and to asymptote out at a certain level to prevent really high rate increases from dominating the component metric.

Some embodiments include a component basis for an absolute relevance metric based on occurrence rate of a key term in the target group. For example, frequency of the key term in the target group can be represented as "func(r1)." A filter function (e.g., sigmoid function) is applied to the occurrence rate of the key term here as well to ignore low frequency terms and to asymptote out at a certain level to prevent really high frequency term from dominating the component metric.

Some embodiments include a component basis for an absolute relevance metric based on duplication discounting. Duplication discounting, represented as "func(d)," can be applied over all other component and/or sub-component metrics. Func(d) can produce a value between 0 and 1, where the value is lower when the key term is duplicated (e.g., variants among similar key terms). Among duplicated key terms, this value is higher for the canonical key term (e.g., the key term ranked higher by remaining component or sub-component metrics) and lower for other key terms. For example, in a foreign-policy document, "President Obama", "Barack Obama", "US President" can show up as candidate duplicates. In this example, the relevance rank engine 218 can assign duplication penalties of 1, 0.5, and 0.5 respectively to these key terms (e.g., "President Obama" is treated as the canonical key term).

Some embodiments include a component basis for a linguistic relevance metric based on an indicator of genuine change. The model trainer engine 210 can generate a statistical model that determines a binary label of whether there is a genuine difference in the occurrence rate of a key term in the target group and in the background group. The statistical model can run a hypothesis test (e.g., used in Frequentist inference, Bayesian inference). Statistical hypothesis tests can define a procedure that controls (e.g., fixes) the probability of incorrectly deciding that a default position (e.g., null hypothesis) is incorrect. The procedure is based on how likely it would be for a set of observations to occur if the null hypothesis were true. Based on statistical assumptions about statistical independence, the hypothesis testing algorithm can select the type of distribution for the test statistic (e.g., Student's t distribution or a normal distribution).

Some embodiments include a component basis for a linguistic relevance metric based on an indicator of contextual relevance. The model trainer engine 210 can train a linguistic model based on training data associated with sample content objects containing sample key terms. The training data can include binary labels of whether there is contextual relevance to the sample key terms. The binary labels can be inputted by a human annotator. As a result, the linguistic model is capable of estimating contextual relevance of a key term based on its features and/or its parent content objects' features (parent content objects being content objects containing the key term).

The relevance rank engine 218 can adjust parameters of combining the above component metrics and bases. These parameters in the evaluation metric can also be learned from a set of human labeled data, picked to correlate with maximizing specific goals. The calculation of a combined relevance ranking score (e.g., evaluative metric) can emulate computation of a normalized discounted cumulative gain (NDCG) metric, where NDCG@1 or NDCG@10 can be picked by a managing user depending on which one reflects the best user experience.

In one embodiment, a combination of the five component bases described above are used in a relevance rank calculation algorithm for the relevance rank engine 218. The first three component bases (e.g., "func(r1-r2)", "func(r1)", and "func(d)") are absolute numeric in nature, and are computed directly from the data. The indicator of genuine change is also numeric. In some embodiments, when the volume of data is large, every increase in occurrence frequency is almost always statistically significant. The indicator of contextual relevance can be produced from a machine learning model that predicts "interestingness" as labeled by human annotators using term level signals (e.g., incoming link entropy, outgoing link entropy, normalized point wise mutual information, frequency percentile of the key term, frequency percentile of individual unigrams composing the key term, other corpus-derived numerical representation of words, such as word2vec, or any combination thereof).

In some embodiments, the relevance rank engine 218 also reject (e.g., reduce ranking score to a minimum) of any key term containing stop words or symbols (e.g., a "delimiter"). In some embodiments, the relevance rank engine 218 can use only a single feature to measure contextual relevance (e.g., NPMI). NPMI is a co-occurrence measure that scores higher for words that mostly occur together e.g., "New York", "Red Sox" vs. low for key terms where each word can occurs with several others, e.g., "of the", but both "of" and "the" occur with many other terms.

Figure 3:
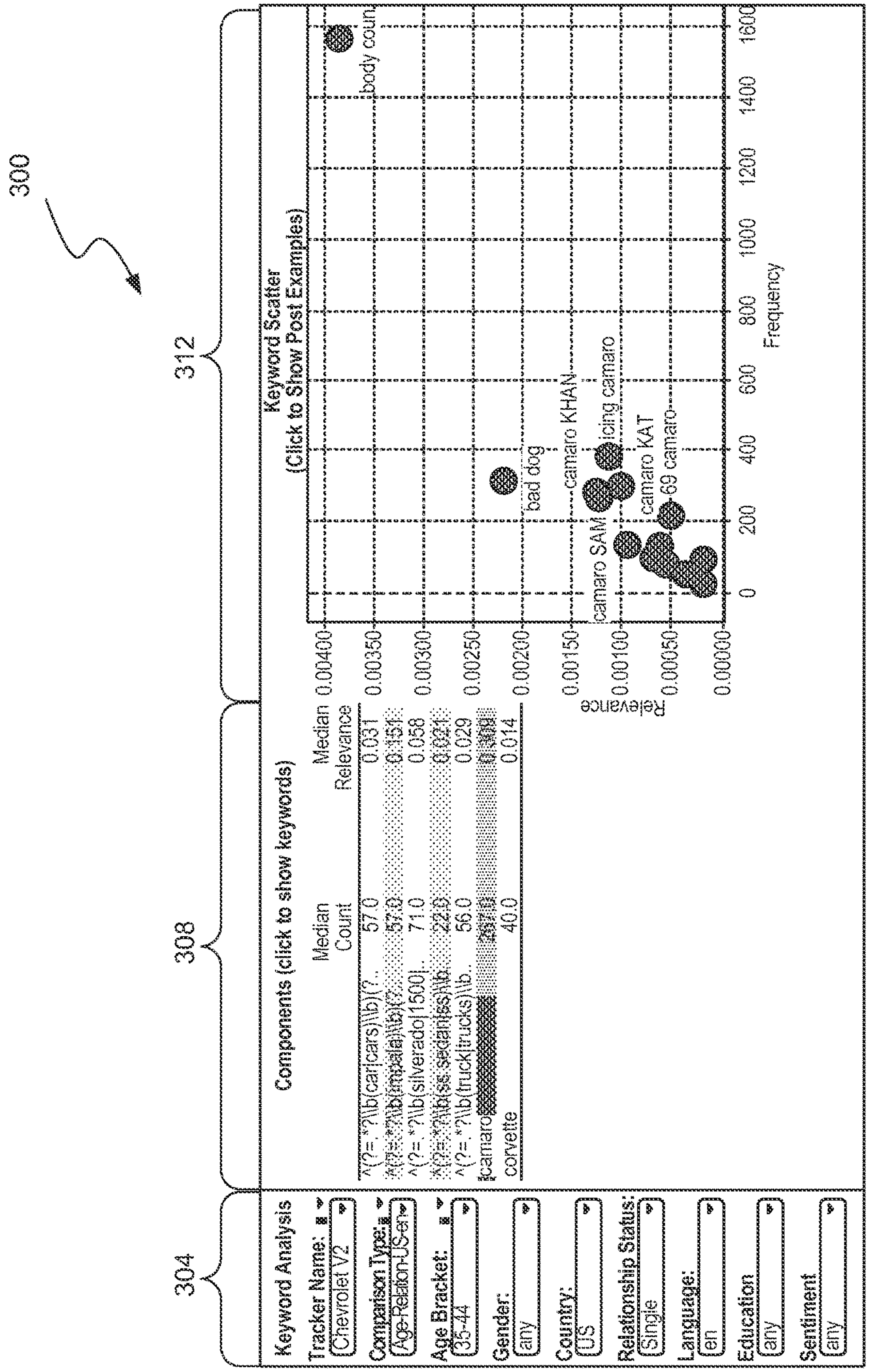
FIG. 3 is an example screenshot of a meme analysis interface associated with a chatter aggregation, in accordance with various embodiments.

FIG. 3 is an example screenshot of a meme analysis interface 300 (e.g., the meme analysis interface 222 of FIG. 2) associated with a chatter aggregation, in accordance with various embodiments. The meme analysis interface 300 can include a pivot definition panel 304, a components panel 308, a meme insight visualization 312, or any combination thereof.

The pivot definition panel 304 can include an interface element (e.g., a drop-down menu, a text field, a button, or any combination thereof) for a user to specify a "tracker name." The tracker name can enable a meme analysis engine (e.g., the meme analysis engine 200 of FIG. 2) to identify, for analysis, a chatter aggregation produced by a tracker engine (e.g., according to a super topic taxonomy). The pivot definition panel 304 can also include an interface element for a user to specify a comparison type. The comparison type can define how the meme analysis interface 300 would display the information (e.g., identified by the meme analysis engine) associated with key terms in a target group as compared to key terms in a background group.

The pivot definition panel 304 can include other interface elements for a user to specify a subset of the chatter aggregation to analyze and to compare. The povoti definition panel 304 can include a description of the target group and background group. For example in current screen-shot, "35-44 year old US singles against all US conversations happening in English in Chevrolet V2 tracker" can be the target group. The background group is inferred from "ComparisonType field", which is "AgeRelation-US-en" in this case. For example, the interface elements can include mechanisms to specify age brackets, gender, relationship status, education level, or any combination thereof, of authoring users of user-generated content in the chatter aggregation. In another example, the interface elements can include mechanisms to specify attributes of content objects that include the key terms. For example, these attributes can include language used in the content objects, country from which the content objects are posted, sentiment attribute of the content objects according to a linguistic model, or any combination thereof. Based on the specified attributes, the meme analysis engine can remove chatter, from the target group and the background group, whose authoring users are not in accordance with the specified attributes.

The components panel 308 can include a description of filters (e.g., terms, regular expressions, topics, or any combination thereof) that occurs in a post to make it in the tracker. For example, this screenshot illustrates an indication of a "Chevrolet V2" tracker and has regular expressions that try to limit aggregations to posts that contain "car", "impala", "silverado", "ss sedan", "truck", "camaro", "corvette", etc. The regular expressions enable further refining of the posts to capture (e.g., such that that not all truck conversations are included). For example, each individual regular expression, term, and/or topic can be considered an element of the tracker.

The components panel 308 can display a table of relevance scores based on an absolute accounting of the occurrence of key terms or on linguistic relevance scores according to a linguistic model. The key terms displayed in the components panel 308 can be determined by the meme analysis engine or by the user. In some embodiments, the meme analysis engine can express the key terms in a regular expression that combines one or more related terms that may have duplicative meaning In the illustrated example, the table can display a median count and a median relevance. The scores can refer to the memes extracted for each element. For example, for "Camaro™," the keywords can be "bad dog", "icing camaro" etc. Median count can refer to the median number of times each keyword occurred in the conversations (e.g., median frequency). Median relevance can refer to a median relevance score from a keyword ranking algorithm (e.g., rate difference and/or linguistic relevance ranker).

The meme insight visualization 312 provides a visual display of information related to top ranking key terms in the target group. For example, the meme insight visualization 312 can be a scatter-plot of relevance and frequency of one or more key terms. In the illustrated example, the meme insight visualization 312 is a scatter plot of the top ranking key terms (e.g., frequency of occurrence in the x-axis and linguistic relevancy score in the y-axis). In some embodiments, the meme insight visualizations 312 can provide a visual display of information related to top ranking key terms in the background group.

In this illustrated example, when an analyst user clicks on one of the key terms, the meme analysis interface 300 can display an example sentence that is the most representative of the key term in response. For example, the meme analysis engine can train a linguistic model based on features derived from user-generated content that has the selected key term. The linguistic model can then produce scores based on features derived from each sentence that contains the selected key term. The sentence with the highest score can then be selected as the most representative sentence. In some embodiments, a most representative sentence is picked using a sequence learning model (e.g., an unsupervised hidden markov model) that learns likelihood of sequence of terms that appear within the posts in the tracker. Such a model can then be applied on training data to predict how likely a sentence is to be generated relative to all others of similar length. The features used for this model can be text tokens (e.g., of certain lengths). The model can be unsupervised. In one example, if a hair tracker has the following posts: (A) "frizzy hair don't care," (B) "curly hair don't care," (C) "hair date with ma homies," and (D) "skip straightener today, curly hair don't care??". An unsupervised model can learn that the sequence "curly hair don't care" is most likely to occur. Sequence (B) can have higher score than sequence A and sequence C, and approximately the same score as sequence D. However, the model can factor in the length of the sequence (e.g., in this example, shorter posts are more likely to occur than longer ones).

FIG. 4 is an example illustration of a comparison definition table 400, in accordance with various embodiments. The comparison definition table 400 represents an example of how a meme analysis engine (e.g., the meme analysis engine 200 of FIG. 2) can track and monitor of the comparison tasks commissioned through a meme analysis interface (e.g., the meme analysis interface 222 of FIG. 2). Each row of the comparison definition table 400 can correspond to a particular comparison task.

In a tracker identifier ("tracker ID") column 402, the comparison definition table 400 can store tracker IDs corresponding to different chatter aggregations. In a comparison identifier ("comparison ID") column 406, the comparison definition table 400 can store comparison IDs corresponding to different comparison tasks commissioned through the meme analysis interface. In the illustrated example, a comparison ID is a text string. In other examples, a comparison ID can be a numeric or alphanumeric string.

In a target group identifier ("target group ID") column 410, the comparison definition table 400 can store target group IDs respectively corresponding to the target groups in the comparison tasks. In the illustrated example, a target group ID is a text string describing the common attribute that defines a target group. In a background group identifier ("background group ID") column 414, the comparison definition table 400 can store background group IDs respectively corresponding to the background groups in the comparison tasks. In the illustrated example, a background group ID is a text string describing the common attribute that defines a background group. In a timestamp column 420, the comparison definition table 400 can store a timestamp of when the comparison task is commissioned or last updated.

FIG. 5A is an example illustration of a first portion of a group definition table 500, in accordance with various embodiments. The group definition table 500 represents an example of how a meme analysis engine (e.g., the meme analysis engine 200 of FIG. 2) can track and monitor sub-groups within chatter aggregations that are used for pivot/comparative analysis. Each row of the group definition table 500 can correspond to a particular group (e.g., a target group or a background group in a comparison task).

The group definition table 500 can include a tracker ID column 502, similar to the tracker ID column 402 of FIG. 4. The group definition table 500 can include a comment column 506 that stores descriptions or comments regarding what the groups. A group ID column 510 stores group identifiers, similar to the target group ID 410 of FIG. 4 or the background group ID 414 of FIG. 4.

The group definition table can include a language specification column 514 storing indications of what languages are used in the respective groups. The group definition table 500 can include sentiment specification column 518 storing indications of whether to analyze key terms associated with positive sentiment or negative sentiment. A relationship status specification column 522 can store indications of whether to analyze content objects made by authoring users in any relationship status or each sub-category of relationship status separately. An age specification column 524 can store indications of whether to analyze content objects made by authoring users in any age group or each age group separately.

FIG. 5B is an example illustration of a second portion of the group definition table 500 of FIG. 5A, in accordance with various embodiments. A gender specification column 530 can store indications of whether to analyze content objects made by authoring users in any gender category or each gender category (e.g., male and female) separately. A region specification column 532 can store indications of whether to analyze content objects made in any region or each known regions separately. For example, the known regions can correspond to continents, cities, states, provinces, or any combination thereof. Country specifications 536 can store indications of whether to analyze content objects made in any country or a specific country. An education level specification column 540 can store indications of whether to analyze content objects made by authoring users in any educational level or each education level separately. The group definition table 500 can include other specification of what content objects to analyze in the defined group, including for example, a date specification column 542, an element specification column 544, a super region specification column 546, and a cluster specification column 548.

The date specification column 542 can enable comparison of memes across time. For example, a target group may be "all en-US conversations 2 weeks ago" and a backgrounp group may be "all en-US conversations *before* 2 weeks ago." This enables the system to surface memes that emerged in that week. A date specification of of "any" means do not segment by date. The element specification column 544 enables comparison of memes across elements of the tracker. For example, in FIG. 3, the components panel 308, all memes are generated for the element "Camaro™." Setting the element specification to "any" would aggregate all "chevy"™ conversations regardless of the car models. The super region specification column 546 enables comparisons across arbitrarily defined regions, such as East/West/Mid-West/South within the US. The cluster specification column 548 enables comparisons across arbitrary groupings of elements to represent an overarching theme. For example, a cluster specification can group together all car-related terms in the "chevy" tracker into a "cars cluster" and all truck-related terms/regular expressions into a "trucks cluster."

Figure 6:
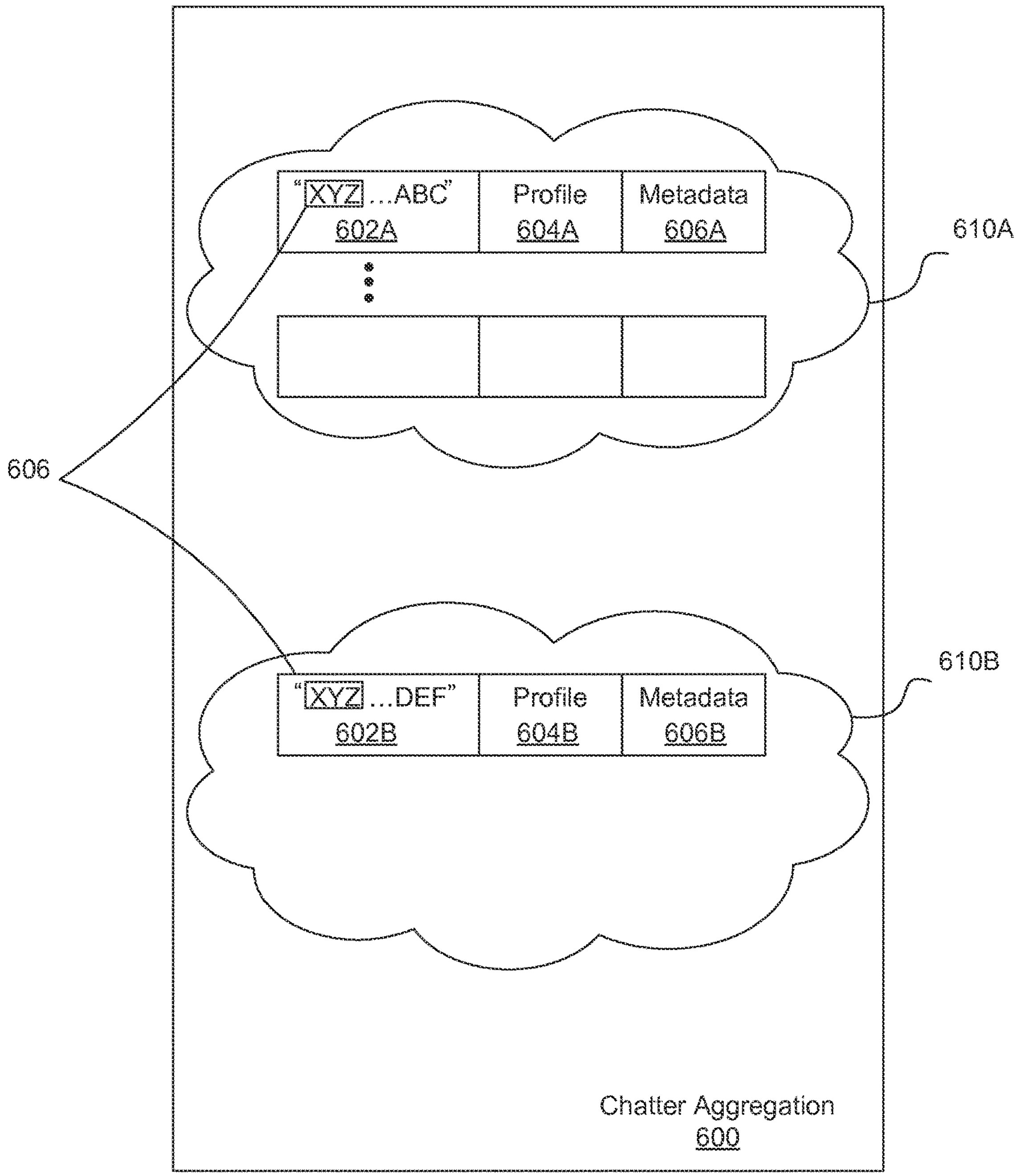
FIG. 6 is a block diagram illustrating a chatter aggregation, in accordance with various embodiments.

FIG. 6 is a block diagram illustrating a chatter aggregation 600, in accordance with various embodiments. The chatter aggregation 600 includes various content objects (e.g., a content object 602A and a content object 602B, collectively as the "content object 602"). For example the content object 602A is associated with an authoring user profile 604A and the content object 602B is associated with an authoring user profile 604B. The chatter aggregation 600 can also include metadata 606A corresponding to the content object 602A and metadata 606B corresponding to the content object 602B.

The content objects 602 can include user-generated text strings. Certain words or phrases can be repeated in different text strings across different content objects. For example, a key term 608 can be part of the text string of the content object 602A and the text string of the content object 602B.

In several embodiments, the chatter aggregation 600 can be segmented into groups (e.g., the groups defined by the group definition table 500 of FIG. 5A and FIG. 5B). For example, the chatter aggregation 600 can include a group 610A and a group 610B. In one example, the group 610A can correspond to a target group in a comparison task and the group 610B can correspond to a background group in the comparison task.

Figure 7:
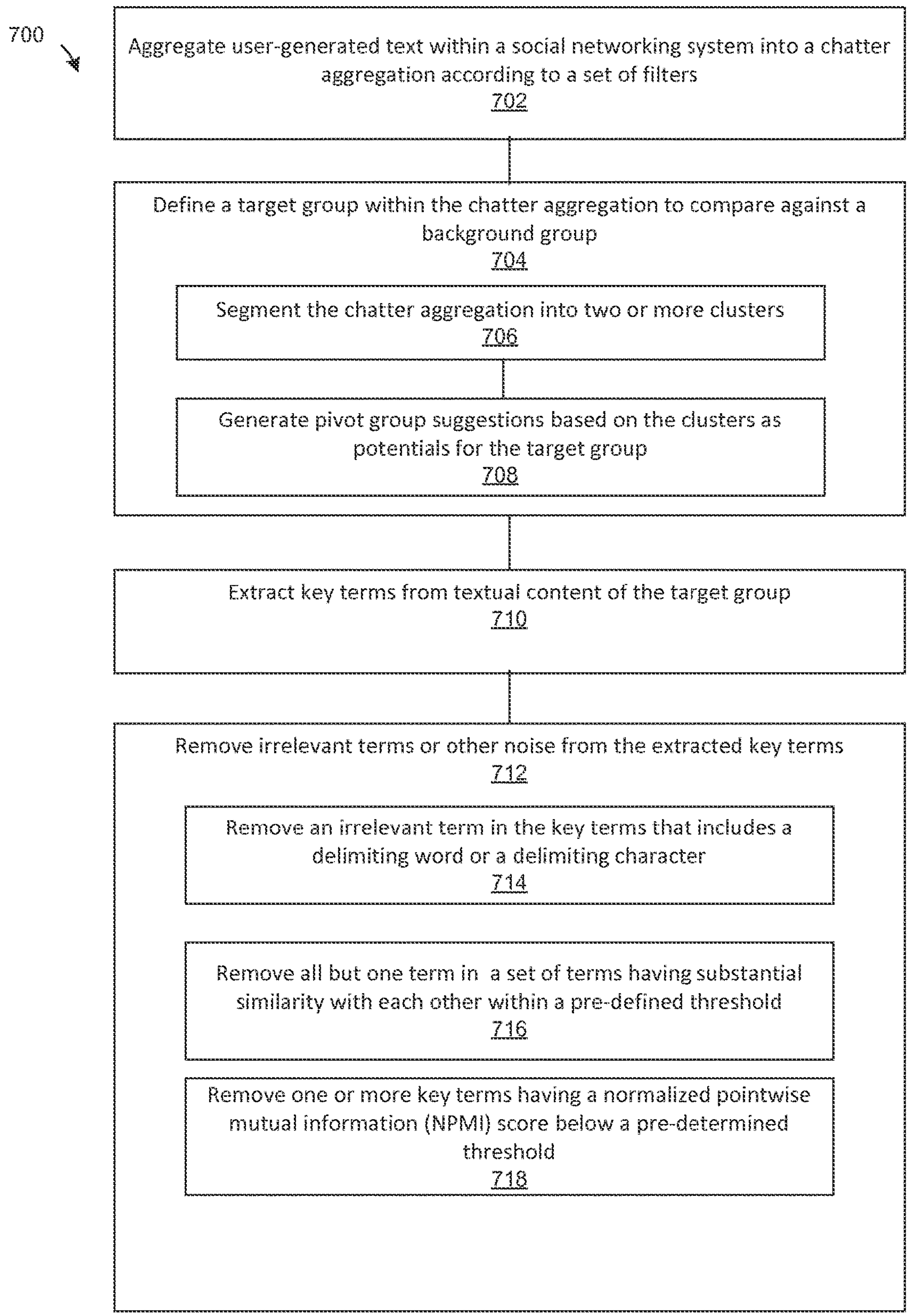
FIG. 7 is a flow chart illustrating a method of operating a concept study system, in accordance with various embodiments.

FIG. 7 is a flow chart illustrating a method 700 of operating a concept study system (e.g., the concept study system 112 of FIG. 1), in accordance with various embodiments. The concept study system can be part of a social networking system (e.g., the online discussion platform system 100 of FIG. 1 or the social networking system 902 of FIG. 9). At step 702, the concept study system can aggregate user-generated content (e.g., text string) within a social networking system into a chatter aggregation according to a set of filters. For example, the set of filters can be classifiers built based on a super topic taxonomy. In some embodiments, aggregating of the user-generated content can include tracking, in real-time or substantially real-time, as new user-generated content is submitted to the social networking system and adding the new user-generated content to the chatter aggregation. For example, the new user-generated content can be tracked in "substantially real-time" by monitoring for when the new user-generated content is submitted to the social networking system and adding the new user-generated content in response to detecting its submission to the social networking system.

At step 704, a meme analysis engine (e.g., the meme analysis engine 200 of FIG. 2) of the concept study system can define a target group within the chatter aggregation to compare against a background group. For example, the meme analysis engine can receive a definition of the target group via a user interface. The target group can be defined based on a user demographic attribute of authoring users of the user-generated content within the chatter aggregation. For example, the user demographic attribute can be an age range, gender, earning range, an education level, or any combination thereof. The target group can be defined based on a metadata attribute of user-generated content within the chatter aggregation. For example, the metadata attribute can include a time range, a geolocation tag (e.g., a region or a country), a content type, a content popularity level, or any combination thereof.

In some embodiments, the meme analysis engine can suggest a definition of the target group. For example, step 704 can include sub-step 706 where the meme analysis engine segments the chatter aggregation into two or more clusters (e.g., utilizing a data clustering algorithm on the demographic profile features of authoring users of the chatter aggregation, metadata attribute features of the content objects in the chatter aggregation, natural language parsing features of the user-generated text strings in the content objects, or any combination thereof). Then at sub-step 708, the meme analysis engine can generate pivot group suggestions based on the clusters as potentials for the target group and/or the background group.

At step 710, the meme analysis engine can extract key terms from textual content of the target group. At step 712, the meme analysis engine can remove irrelevant terms or other noise from the extracted key terms. For example, step 712 can include sub-step 714 where the meme analysis engine identifies and removes, from the key terms, an irrelevant term that includes a delimiting word or a delimiting character. The delimiting word can be in a particular word class according a grammar ruleset. For example, the delimiting word can be a conjunction or a preposition. For example, the delimiting character can be a comma, a semicolon, or a colon.

In another example, step 712 can include sub-step 716 where the meme analysis engine identifies a set of terms having substantial similarity, with each other, within a pre-defined threshold. Then, the meme analysis engine can remove all but one of the set of terms from the key terms (e.g., to remove redundancy). In some embodiments, the meme analysis engine can utilize text analysis to determine a similarity score. For example, the number of overlapping characters in between two key terms can be a basis for calculating the similarity score between the key terms. In some embodiments, the meme analysis engine can utilize a linguistic model to determine a similarity score. The meme analysis engine can train the linguistic model based on training data of key term pairs that are labeled as either different or the same. For example, the training data can train the linguistic model to comprehend that while "Mike Jordan" is different from "Michael Jordan" and "George Bush" is different from "George W. Bush," "Chevrolet Malibu" is the same as "Chevy Malibu."

In yet another example, step 712 can include sub-step 718 where the meme analysis engine removes, from the key terms, one or more terms having a normalized pointwise mutual information (NPMI) score below a pre-determined threshold. For example, if a key term is a bigram, the NPMI score can be a normalized value between [−1, 1] that measures how frequently words in bigrams occur together. The NPMI can be tested against the user-generated content in the chatter aggregation or across the social networking system.

Figure 8:
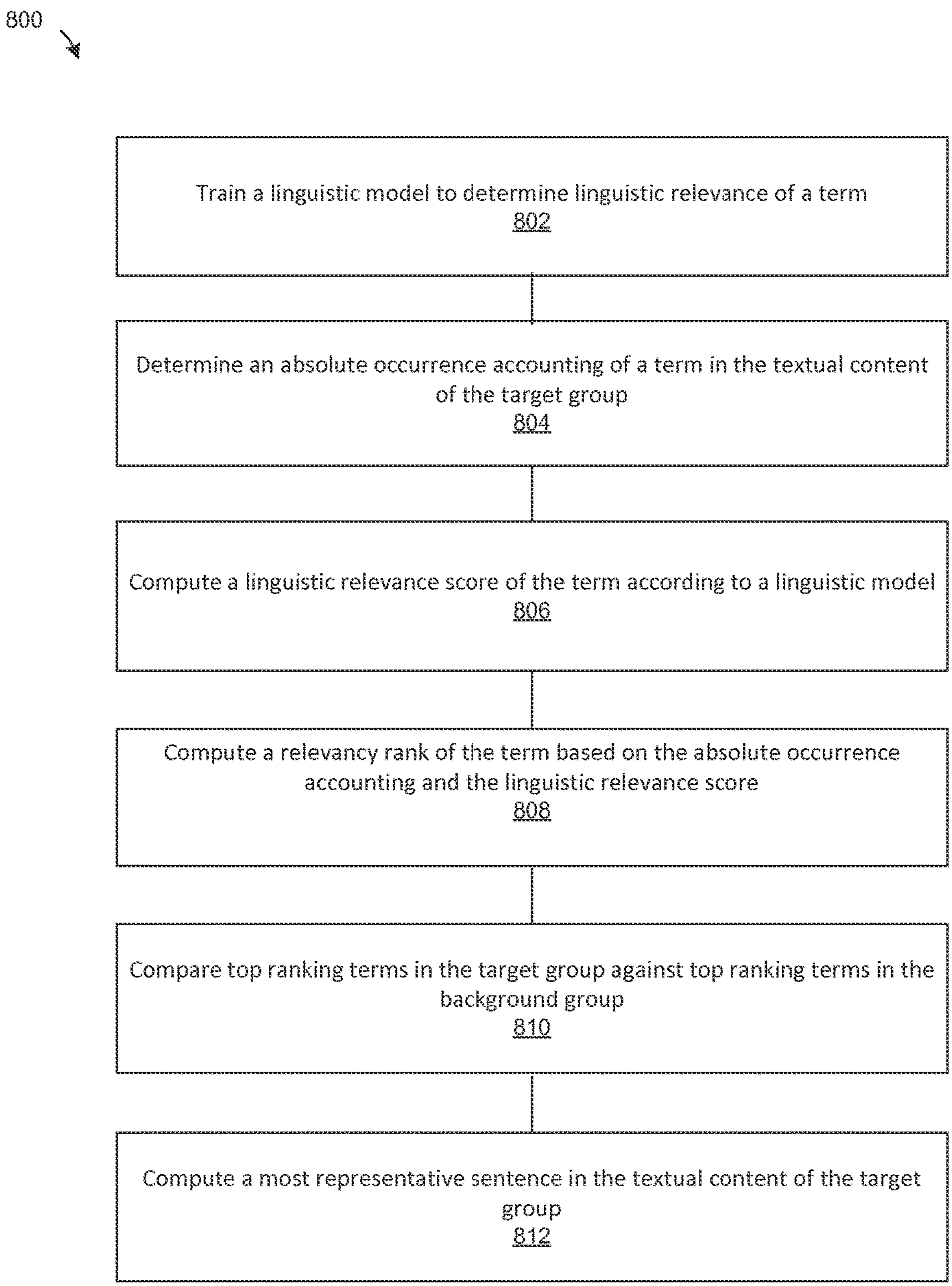
FIG. 8 is a flow chart illustrating a method of operating a meme analysis engine to analyze key terms in a target group, in accordance with various embodiments.

FIG. 8 is a flow chart illustrating a method 800 of operating a meme analysis engine (e.g., the meme analysis engine 200 of FIG. 2) to analyze key terms within a target group, in accordance with various embodiments. The method 800 can follow after the method 700 of FIG. 7. At step 802, the meme analysis engine can train a linguistic model to determine linguistic relevance of key terms found in the method 700. At step 804, the meme analysis engine can determine an absolute occurrence accounting of a term, among the key terms, in the textual content of the target group. The absolute occurrence accounting can include raw occurrence rate of the term within the textual content of the target group, change in the raw occurrence rate, raw count of instances of the term in the textual content of the target group, raw volume of user-generated content objects containing the term in the textual content of the target group, or any combination thereof.

At step 806, the meme analysis engine can compute a linguistic relevance score of the term according to a linguistic model with features of content objects containing the term as input. At step 808, the meme analysis engine can compute a relevancy rank of the term based on the absolute occurrence accounting of the term and the linguistic relevance score of the term.

At step 810, the meme analysis engine can compare the top ranking terms in the target group against the top ranking terms in the background group (e.g., according to relevance ranks of the key terms including the relevance rank computed at step 808). For example, the meme analysis engine can render the top ranking terms of the target group against the top ranking terms of the background group in a comparative illustration. The comparing of the relevance rankings can be used as part of a hypothesis testing to determine statistical probability that the target group has certain key terms occurring more frequently against the background group. In some embodiments, the meme analysis engine can render or plot a visual indication of the term in an illustration (e.g., meme insight visualization 312 of FIG. 3) according to the absolute accounting and/or the linguistic relevance score.

At step 812, the meme analysis engine can compute a most representative sentence in the textual content of the target group. In some embodiments, the meme analysis engine can compute a most representative sentence in the textual content of the background group.

While processes or blocks are presented in a given order in this disclosure, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

FIG. 9 is a high-level block diagram of a system environment 900 suitable for a social networking system 902, in accordance with various embodiments. The system environment 900 shown in FIG. 9 includes the social networking system 902 (e.g., the online discussion platform system 100 of FIG. 1), a client device 904A, and a network channel 906. The system environment 900 can include other client devices as well, e.g., a client device 904B and a client device 904C. In other embodiments, the system environment 900 may include different and/or additional components than those shown by FIG. 9. The meme analysis engine 200 of FIG. 2 can be implemented in the social networking system 902.

Social Networking System Environment and Architecture

The social networking system 902, further described below, comprises one or more computing devices storing user profiles associated with users (i.e., social networking accounts) and/or other objects as well as connections between users and other users and/or objects. Users join the social networking system 902 and then add connections to other users or objects of the social networking system to which they desire to be connected. Users of the social networking system 902 may be individuals or entities, e.g., businesses, organizations, universities, manufacturers, etc. The social networking system 902 enables its users to interact with each other as well as with other objects maintained by the social networking system 902. In some embodiments, the social networking system 902 enables users to interact with third-party websites and a financial account provider.

Based on stored data about users, objects and connections between users and/or objects, the social networking system 902 generates and maintains a "social graph" comprising multiple nodes interconnected by multiple edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 902 adds and/or modifies edges connecting the various nodes to reflect the interactions.

The client device 904A is a computing device capable of receiving user input as well as transmitting and/or receiving data via the network channel 906. In at least one embodiment, the client device 904A is a conventional computer system, e.g., a desktop or laptop computer. In another embodiment, the client device 904A may be a device having computer functionality, e.g., a personal digital assistant (PDA), mobile telephone, a tablet, a smart-phone or similar device. In yet another embodiment, the client device 904A can be a virtualized desktop running on a cloud computing service. The client device 904A is configured to communicate with the social networking system 902 via a network channel 906 (e.g., an intranet or the Internet). In at least one embodiment, the client device 904A executes an application enabling a user of the client device 904A to interact with the social networking system 902. For example, the client device 904A executes a browser application to enable interaction between the client device 904A and the social networking system 902 via the network channel 906. In another embodiment, the client device 904A interacts with the social networking system 902 through an application programming interface (API) that runs on the native operating system of the client device 904A, e.g., IOS® or ANDROID™.

The client device 904A is configured to communicate via the network channel 906, which may comprise any combination of local area and/or wide area networks, using both wired and wireless communication systems. In at least one embodiment, the network channel 906 uses standard communications technologies and/or protocols. Thus, the network channel 906 may include links using technologies, e.g., Ethernet, 802.11, worldwide interoperability for microwave access (WiMAX), 3G, 4G, CDMA, digital subscriber line (DSL), etc. Similarly, the networking protocols used on the network channel 906 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 906 may be represented using technologies and/or formats including hypertext markup language (HTML) or extensible markup language (XML). In addition, all or some of links can be encrypted using conventional encryption technologies, e.g., secure sockets layer (SSL), transport layer security (TLS), and Internet Protocol security (IPsec).

The social networking system 902 includes a profile store 910, a content store 912, an action logger 914, an action log 916, an edge store 918, a web server 924, a message server 926, an application service interface (API) request server 928, a concept study system 932, a topic tagger engine 934, an image tagger engine 936, or any combination thereof. In other embodiments, the social networking system 902 may include additional, fewer, or different modules for various applications.

User of the social networking system 902 can be associated with a user profile, which is stored in the profile store 910. The user profile is associated with a social networking account. A user profile includes declarative information about the user that was explicitly shared by the user, and may include profile information inferred by the social networking system 902. In some embodiments, a user profile includes multiple data fields, each data field describing one or more attributes of the corresponding user of the social networking system 902. The user profile information stored in the profile store 910 describes the users of the social networking system 902, including biographic, demographic, and other types of descriptive information, e.g., work experience, educational history, gender, hobbies or preferences, location and the like. A user profile may also store other information provided by the user, for example, images or videos. In some embodiments, images of users may be tagged with identification information of users of the social networking system 902 displayed in an image. A user profile in the profile store 910 may also maintain references to actions by the corresponding user performed on content items (e.g., items in the content store 912) and stored in the edge store 918 or the action log 916.

A user profile may be associated with one or more financial accounts, enabling the user profile to include data retrieved from or derived from a financial account. In some embodiments, information from the financial account is stored in the profile store 910. In other embodiments, it may be stored in an external store.

A user may specify one or more privacy settings, which are stored in the user profile, that limit information shared through the social networking system 902. For example, a privacy setting limits access to cache appliances associated with users of the social networking system 902.

The content store 912 stores content items (e.g., images, videos, or audio files) associated with a user profile. The content store 912 can also store references to content items that are stored in an external storage or external system. Content items from the content store 912 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system by displaying content related to users, objects, activities, or functionalities of the social networking system 902. Examples of social networking content items include suggested connections or suggestions to perform other actions, media provided to, or maintained by, the social networking system 902 (e.g., pictures or videos), status messages or links posted by users to the social networking system, events, groups, pages (e.g., representing an organization or commercial entity), and any other content provided by, or accessible via, the social networking system.

The content store 912 also includes one or more pages associated with entities having user profiles in the profile store 910. An entity can be a non-individual user of the social networking system 902, e.g., a business, a vendor, an organization, or a university. A page includes content associated with an entity and instructions for presenting the content to a social networking system user. For example, a page identifies content associated with the entity's user profile as well as information describing how to present the content to users viewing the brand page. Vendors may be associated with pages in the content store 912, enabling social networking system users to more easily interact with the vendor via the social networking system 902. A vendor identifier is associated with a vendor's page, thereby enabling the social networking system 902 to identify the vendor and/or to retrieve additional information about the vendor from the profile store 910, the action log 916 or from any other suitable source using the vendor identifier. In some embodiments, the content store 912 may also store one or more targeting criteria associated with stored objects and identifying one or more characteristics of a user to which the object is eligible to be presented.

The action logger 914 receives communications about user actions on and/or off the social networking system 902, populating the action log 916 with information about user actions. Such actions may include, for example, adding a connection to another user, sending a message to another user, uploading an image, reading a message from another user, viewing content associated with another user, attending an event posted by another user, among others. In some embodiments, the action logger 914 receives, subject to one or more privacy settings, content interaction activities associated with a user. In addition, a number of actions described in connection with other objects are directed at particular users, so these actions are associated with those users as well. These actions are stored in the action log 916.

In accordance with various embodiments, the action logger 914 is capable of receiving communications from the web server 924 about user actions on and/or off the social networking system 902. The action logger 914 populates the action log 916 with information about user actions to track them. This information may be subject to privacy settings associated with the user. Any action that a particular user takes with respect to another user is associated with each user's profile, through information maintained in a database or other data repository, e.g., the action log 916. Such actions may include, for example, adding a connection to the other user, sending a message to the other user, reading a message from the other user, viewing content associated with the other user, attending an event posted by another user, being tagged in photos with another user, liking an entity, etc.

The action log 916 may be used by the social networking system 902 to track user actions on the social networking system 902, as well as external website that communicate information to the social networking system 902. Users may interact with various objects on the social networking system 902, including commenting on posts, sharing links, and checking-in to physical locations via a mobile device, accessing content items in a sequence or other interactions. Information describing these actions is stored in the action log 916. Additional examples of interactions with objects on the social networking system 902 included in the action log 916 include commenting on a photo album, communications between users, becoming a fan of a musician, adding an event to a calendar, joining a groups, becoming a fan of a brand page, creating an event, authorizing an application, using an application and engaging in a transaction. Additionally, the action log 916 records a user's interactions with advertisements on the social networking system 902 as well as applications operating on the social networking system 902. In some embodiments, data from the action log 916 is used to infer interests or preferences of the user, augmenting the interests included in the user profile, and enabling a more complete understanding of user preferences.

Further, user actions that happened in particular context, e.g., when the user was shown or was seen accessing particular content on the social networking system 902, can be captured along with the particular context and logged. For example, a particular user could be shown/not-shown information regarding candidate users every time the particular user accessed the social networking system 902 for a fixed period of time. Any actions taken by the user during this period of time are logged along with the context information (i.e., candidate users were provided/not provided to the particular user) and are recorded in the action log 916. In addition, a number of actions described below in connection with other objects are directed at particular users, so these actions are associated with those users as well.

The action log 916 may also store user actions taken on external websites services associated with the user. The action log 916 records data about these users, including viewing histories, advertisements that were engaged, purchases or rentals made, and other patterns from content requests and/or content interactions.

In some embodiments, the edge store 918 stores the information describing connections between users and other objects on the social networking system 902 in edge objects. The edge store 918 can store the social graph described above. Some edges may be defined by users, enabling users to specify their relationships with other users. For example, users may generate edges with other users that parallel the users' real-life relationships, e.g., friends, co-workers, partners, and so forth. Other edges are generated when users interact with objects in the social networking system 902, e.g., expressing interest in a page or a content item on the social networking system, sharing a link with other users of the social networking system, and commenting on posts made by other users of the social networking system. The edge store 918 stores edge objects that include information about the edge, e.g., affinity scores for objects, interests, and other users. Affinity scores may be computed by the social networking system 902 over time to approximate a user's affinity for an object, interest, and other users in the social networking system 902 based on the actions performed by the user. Multiple interactions of the same type between a user and a specific object may be stored in one edge object in the edge store 918, in at least one embodiment. In some embodiments, connections between users may be stored in the profile store 910. In some embodiments, the profile store 910 may reference or be referenced by the edge store 918 to determine connections between users. Users may select from predefined types of connections, or define their own connection types as needed.

The web server 924 links the social networking system 902 via a network to one or more client devices; the web server 924 serves web pages, as well as other web-related content, e.g., Java, Flash, XML, and so forth. The web server 924 may communicate with the message server 926 that provides the functionality of receiving and routing messages between the social networking system 902 and client devices. The messages processed by the message server 926 can be instant messages, email messages, text and SMS (short message service) messages, photos, or any other suitable messaging technique. In some embodiments, a message sent by a user to another user can be viewed by other users of the social networking system 902, for example, by the connections of the user receiving the message. An example of a type of message that can be viewed by other users of the social networking system besides the recipient of the message is a wall post. In some embodiments, a user can send a private message to another user that can only be retrieved by the other user.

The API request server 928 enables external systems to access information from the social networking system 902 by calling APIs. The information provided by the social network may include user profile information or the connection information of users as determined by their individual privacy settings. For example, a system interested in predicting the probability of users forming a connection within a social networking system may send an API request to the social networking system 902 via a network. The API request server 928 of the social networking system 902 receives the API request. The API request server 928 processes the request by determining the appropriate response, which is then communicated back to the requesting system via a network.

The concept study system 932 can be the concept study system 112 of FIG. 1. The concept study system 932 can enable analyst users to define, modify, track, execute, compare, analyze, evaluate, and/or deploy one or more concept studies associated with one or more super topic taxonomies. A meme analysis engine (e.g., the meme analysis engine 200 of FIG. 2) of the concept study system 932 can analyze user activities (e.g., tracked by the action logger 914) in the social networking system 902 to identify how discussion of a particular central concept differs amongst different groups of users, different regions, different discussion platforms, or any combination thereof. The meme analysis engine can compute relevance rankings of key terms/memes used in the analyzed discussions.

The topic tagger engine 934 can analyze text strings within the content objects in the content store 912 to produce a reference to a social network page. The image tagger engine 936 can analyze multimedia objects within the content objects in the content store 912 to produce a reference to a social network page. The concept study system 932 can make use of the references (e.g., topic tags) produced from the topic tagger engine 934 or the image tagger engine 936 to classify user activities for concept studies.

Functional components (e.g., circuits, devices, engines, modules, and data storages, etc.) associated with the online discussion platform system 100 of FIG. 1, the meme analysis engine 200 of FIG. 2, and/or the social networking system 902 of FIG. 9, can be implemented as a combination of circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). The systems, engines, or devices described may include additional, fewer, or different functional components for various applications.

Figure 10:
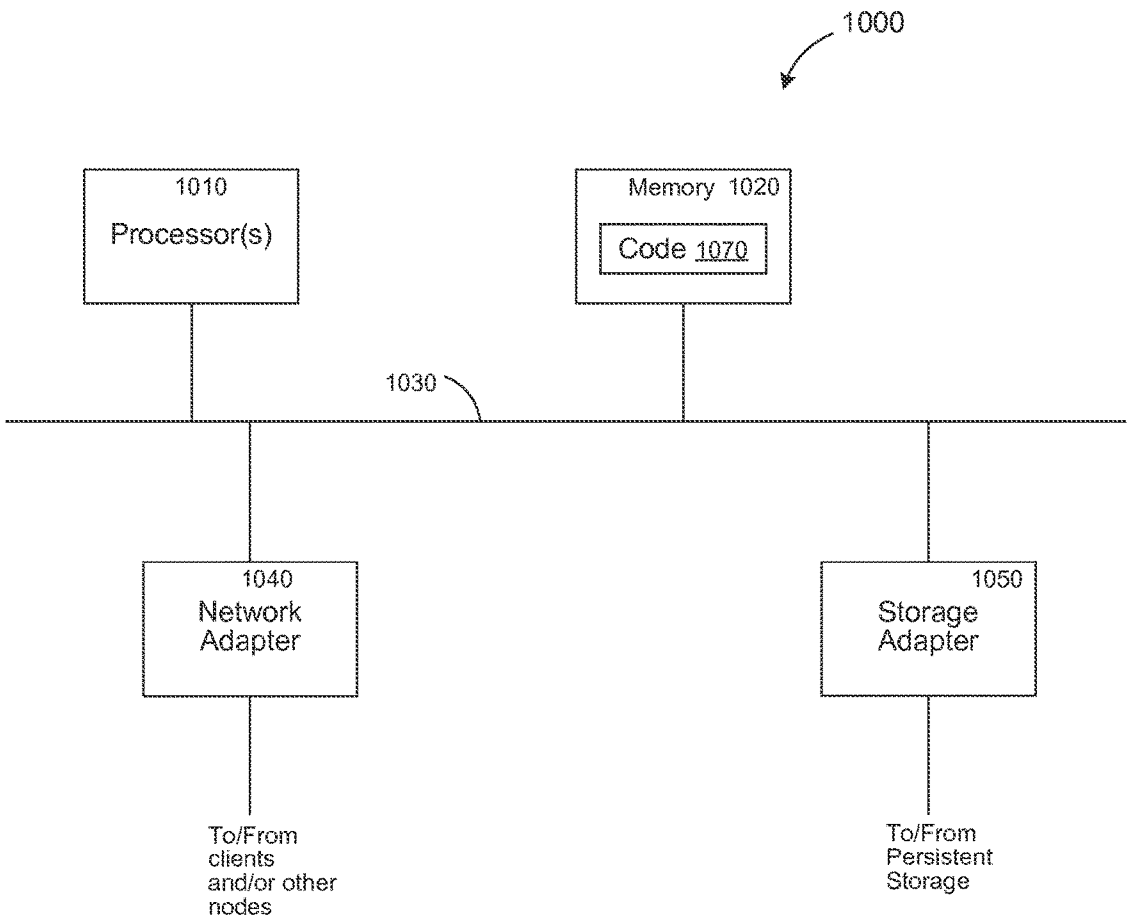
FIG. 10 is a block diagram of an example of a computing device, which may represent one or more computing device or server described herein, in accordance with various embodiments.

FIG. 10 is a block diagram of an example of a computing device 1000, which may represent one or more computing device or server described herein, in accordance with various embodiments. The computing device 1000 can be one or more computing devices that implement the online discussion platform system 100 of FIG. 1 and/or the meme analysis engine 200 of FIG. 2. The computing device 1000 can execute at least part of the method 700 of FIG. 7 and/or the method 800 of FIG. 8. The computing device 1000 includes one or more processors 1010 and memory 1020 coupled to an interconnect 1030. The interconnect 1030 shown in FIG. 10 is an abstraction that represents any one or more separate physical buses, point-to-point connections, or both connected by appropriate bridges, adapters, or controllers. The interconnect 1030, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1010 is/are the central processing unit (CPU) of the computing device 1000 and thus controls the overall operation of the computing device 1000. In certain embodiments, the processor(s) 1010 accomplishes this by executing software or firmware stored in memory 1020. The processor(s) 1010 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1020 is or includes the main memory of the computing device 1000. The memory 1020 represents any form of random access memory (RAM), read-only memory (ROM), flash memory, or the like, or a combination of such devices. In use, the memory 1020 may contain a code 1070 containing instructions according to the mesh connection system disclosed herein.

Also connected to the processor(s) 1010 through the interconnect 1030 are a network adapter 1040 and a storage adapter 1050. The network adapter 1040 provides the computing device 1000 with the ability to communicate with remote devices, over a network and may be, for example, an Ethernet adapter or Fibre Channel adapter. The network adapter 1040 may also provide the computing device 1000 with the ability to communicate with other computers. The storage adapter 1050 enables the computing device 1000 to access a persistent storage, and may be, for example, a Fibre Channel adapter or SCSI adapter.

The code 1070 stored in memory 1020 may be implemented as software and/or firmware to program the processor(s) 1010 to carry out actions described above. In certain embodiments, such software or firmware may be initially provided to the computing device 1000 by downloading it from a remote system through the computing device 1000 (e.g., via network adapter 1040).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; and/or optical storage media; flash memory devices), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

Some embodiments include a social networking system. The social networking system can include a classifier machine repository storing one or more active classifier machines; a machine generator engine configured to generate a classifier machine corresponding to a topical content analysis study based on a super topic taxonomy having one or more concept identifiers and to store the classifier machine in the classifier machine repository; a study-specific data aggregation container associated with the topical content analysis study; and an activity processor configured to implement a machines aggregate combining the active classifier machines in the classifier machine repository to process a content object associated with a user activity and to aggregate at least an attribute of the content object or the user activity in the study-specific data container. In some embodiments, the machines aggregate can process the content object in real-time in response to the social networking system receiving the user activity.

What is claimed is:

1. A computer-implemented method, comprising:

aggregating user-generated content objects within a social networking system into a chatter aggregation according to a set of filters;

defining, by a meme analysis engine, a target group within the chatter aggregation to compare against a background group;

extracting, by the meme analysis engine, multiword terms from textual content of the target group;

determining, by the meme analysis engine, a relevancy rank of a term in the multiword terms based on an accounting of the term in the textual content of the target group and a linguistic relevance score of the term according to a linguistic statistical model, the linguistic statistical model being trained by the meme analysis engine based on the user-generated content objects comprising the term, wherein the linguistic relevance score is based on a binary label associated with a probability indicating whether there is a difference in an occurrence rate of the term in the target group and in the background group, wherein the binary label is determined by the linguistic statistical model, and wherein the probability is generated by one or more statistical hypothesis tests based on the linguistic statistical model;

sending, by the meme analysis engine to a client device of a user, instructions for rendering, according to the relevancy ranking, the term in an illustrative comparison of the target group against the background group in a meme analysis interface;

receiving, from the client device, a selection of the term by the user;

generating, by the meme analysis engine, a representative sentence for the term based on the linguistic statistical model; and sending, via the meme analysis interface, instructions for rendering the generated sentence.

2. The computer-implemented method of claim 1, wherein aggregating the user-generated content objects includes:

tracking, in real-time, a user-generated content object newly submitted to the social networking system; and adding the user-generated content object to the chatter aggregation.

3. The computer-implemented method of claim 1, wherein the target group is defined based on a target user demographic attribute of authoring users of the user-generated content objects within the chatter aggregation.

4. The computer-implemented method of claim 1, wherein the target group is defined based on a target metadata attribute of the user-generated content objects within the chatter aggregation.

5. The computer-implemented method of claim 4, wherein the target metadata attribute includes timestamp, geolocation information, content type, content popularity, or any combination thereof.

6. The computer-implemented method of claim 1, further comprising removing an irrelevant noise term from the multiword terms.

7. The computer-implemented method of claim 6, wherein removing the irrelevant noise term includes identifying the irrelevant noise term, from among the multiword term, that includes a delimiting word or a delimiting character, wherein the delimiting word is in a particular word class according a grammar ruleset and wherein the delimiting character is a particular punctuation.

8. The computer-implemented method of claim 6, wherein removing the irrelevant noise term includes:

identifying a set of terms having substantial similarity, within a pre-defined threshold, with each other; and removing all but one of the set of terms from the multiword terms.

9. The computer-implemented method of claim 6, wherein removing the irrelevant noise term includes removing one or more terms having a normalized pointwise mutual information (NPMI) score below a pre-defined threshold from the multiword terms.

10. The computer-implemented method of claim 1, further comprising:

clustering the chatter aggregation into two or more clusters; and generating pivot group suggestions based on the clusters as potentials for the target group.

11. The computer-implemented method of claim 1, wherein the accounting of the term includes raw occurrence rate of the term within the textual content of the target group, change in the raw occurrence rate, raw count of instances of the term in the textual content of the target group, raw volume of the user-generated content objects containing the term in the textual content of the target group, or any combination thereof.

12. The computer-implemented method of claim 1, further comprising plotting a visual representation of the term in a plot graph according to the accounting of the term.

13. One or more computer-readable non-transitory storage media embodying software that is operable when executed by a computer system to:

aggregate user-generated content objects within a social networking system into a chatter aggregation according to a set of filters;

define, by a meme analysis engine, a target group within the chatter aggregation to compare against a background group;

extract, by the meme analysis engine, multiword terms from textual content of the target group;

determine, by the meme analysis engine, a relevancy rank of a term in the multiword terms based on an accounting of the term in the textual content of the target group and a linguistic relevance score of the term according to a linguistic statistical model, the linguistic statistical model being trained by the meme analysis engine based on the user-generated content objects comprising the term, wherein the linguistic relevance score is based on a binary label associated with a probability indicating whether there is a difference in an occurrence rate of the term in the target group and in the background group, wherein the binary label is determined by the linguistic statistical model, and wherein the probability is generated by one or more statistical hypothesis tests based on the linguistic statistical model;

send, by the meme analysis engine to a client device of a user, instructions for rendering, according to the relevancy ranking, the term in an illustrative comparison of the target group against the background group in a meme analysis interface;

receive, from the client device, a selection of the term by a user;

generate, by the meme analysis engine, a representative sentence for the term based on the linguistic statistical model; and send, via the meme analysis interface, instructions for rendering the generated sentence.

14. The computer readable data memory of claim 13, wherein the software is further operable when executed to:

compute the linguistic relevancy score of the term according to a linguistic statistical model and natural language features in the content objects containing the term as input to the linguistic statistical model.

15. The computer readable data memory of claim 14, wherein the software is further operable when executed to:

receive an operator label on a sample term in a sample text, wherein the operator label specifies a user-identified relevancy score of the sample term; and train the linguistic model based on at least the sample term and the operator label.

16. The computer readable data memory of claim 14, wherein the linguistic statistical model is trained to identify commercial intent, spam, a particular sentiment, or any combination thereof, in the textual content.

17. The computer readable data memory of claim 13, wherein the software is further operable when executed to:

compute a most representative sentence in the textual content of the target group.

18. The computer readable data memory of claim 13, wherein the software is further operable when executed to:

compute a statistical hypothesis testing of whether a difference between the top ranking terms in the target group differ from the other top ranking terms in the background group is statistically significant.

19. The computer readable data memory of claim 13, wherein the software is further operable when executed to:

select the background group automatically based on the target group.

20. A system comprising: one or more processors; and a non-transitory memory coupled to the processors comprising instructions executable by the processors, the processors operable when executing the instructions to:

aggregate user-generated content objects within a social networking system into a chatter aggregation according to a set of filters;

define, by a meme analysis engine, a target group within the chatter aggregation to compare against a background group;

extract, by the meme analysis engine, multiword terms from textual content of the target group;

determine, by the meme analysis engine, a relevancy rank of a term in the multiword terms based on an accounting of the term in the textual content of the target group and a linguistic relevance score of the term according to a linguistic statistical model, the linguistic statistical model being trained by the meme analysis engine based on the user-generated content objects comprising the term, wherein the linguistic relevance score is based on a binary label associated with a probability indicating whether there is a difference in an occurrence rate of the term in the target group and in the background group, wherein the binary label is determined by the linguistic statistical model, and wherein the probability is generated by one or more statistical hypothesis tests based on the linguistic statistical model;

send, by the meme analysis engine to a client device of a user, instructions for rendering, according to the relevancy ranking, the term in an illustrative comparison of the target group against the background group in a meme analysis interface;

receive, from the client device, a selection of the term by the user;

generate, by the meme analysis engine, a representative sentence for the term based on the linguistic statistical model; and send, via the meme analysis interface, instructions for rendering the generated sentence.

* * * * *